United States Patent
Shen

(10) Patent No.: US 8,665,314 B2
(45) Date of Patent: Mar. 4, 2014

(54) IMAGE PROCESSING SYSTEM AND PROCESSING METHOD THEREOF

(75) Inventor: Ming-Xiang Shen, Zhejiang Province (CN)

(73) Assignee: Arcsoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 713 days.

(21) Appl. No.: 12/772,489

(22) Filed: May 3, 2010

(65) Prior Publication Data

US 2010/0289868 A1    Nov. 18, 2010

(30) Foreign Application Priority Data

May 12, 2009    (CN) .......................... 2009 1 0138670

(51) Int. Cl.
*H04N 7/14*    (2006.01)

(52) U.S. Cl.
USPC ................... 348/14.15; 379/202.01; 382/240

(58) Field of Classification Search
USPC ....................... 348/14.12–14.15; 375/240.26; 379/202.01; 315/368.11; 382/240
See application file for complete search history.

(56) References Cited

U.S. PATENT DOCUMENTS

| 7,472,039 B2 | 12/2008 | Yamamura et al. |
| 2006/0244839 A1 | 11/2006 | Glatron et al. |
| 2009/0116563 A1 * | 5/2009 | Kawamura et al. ...... 375/240.26 |

FOREIGN PATENT DOCUMENTS

| CN | 1988648 A | 6/2007 |
| CN | 101212751 A | 7/2008 |
| TW | 200803509 A | 1/2008 |

* cited by examiner

*Primary Examiner* — Md S Elahee
(74) *Attorney, Agent, or Firm* — Muncy, Geissler, Olds & Lowe, P.C.

(57) ABSTRACT

A processing method of an image processing system, which is applied with at least one real-time messaging video communication system of an electronic device and contains a start module, a process detecting module and an image processing module, includes the steps of: installing the process detecting module into the real-time messaging video communication system by the start module; detecting whether the real-time messaging video communication system starts the real-time communication by the process detecting module; installing the image processing module into the real-time messaging video communication system when the real-time messaging video communication system starts the real-time communication; and generating a plurality of converted frame data by the image processing module in accordance with a plurality of frame data to be displayed by the real-time messaging video communication system. In addition, the image processing system is also disclosed.

15 Claims, 3 Drawing Sheets

IMAGE PROCESSING SYSTEM AND PROCESSING METHOD THEREOF

CROSS REFERENCE TO RELATED APPLICATIONS

This Non-provisional application claims priority under 35 U.S.C. §119(a) on Patent Application No(s). 200910138670.9 filed in People's Republic of China on May 12, 2009, the entire contents of which are hereby incorporated by reference.

BACKGROUND OF THE INVENTION

1. Field of Invention

The present invention relates to an image processing system and its processing method. More particularly, the present invention relates to an image processing system, which is applied with a real-time messaging video communication system, and a processing method thereof.

2. Related Art

With the development of electronic industry and the advance of internet technique, transmitting messages through internet is fairly efficient, accurate and convenient nowadays. In addition, because it is not restricted by time and region, real-time messaging communication systems gradually surpass other communication means and become the most important modern communication tool.

The early real-time communication usually transmitted text messages only. In fact, sometimes it is quite hard to express feelings or emotions through vocabularies. Therefore, a real-time messaging communication system with a visual communication function is recently invented so that users can see each other on monitors during the real-time communication. Although users can see each other by such a visual communication function, the previous communication systems usually cannot provide clear images under the limitations of camera and internet bandwidth. Thus, the users have to endure the blurred images during real-time communication.

Consequently, it is desirable to provide an image processing system and its processing method that can display clear images without upgrading cameras and internet bandwidths when the real-time messaging video communication system starts the real-time communication, thereby improving the practicability of the real-time messaging video communication system.

SUMMARY OF THE INVENTION

In view of the foregoing, the present invention is to provide an image processing system and its processing method that can display clear images when the real-time messaging video communication system starts the real-time communication without upgrading the cameras and the internet bandwidths, thereby improving the practicability of the real-time messaging video communication system.

To achieve the above, an image processing system in accordance with the present invention is applied with at least one real-time messaging video communication system of an electronic device and includes a start module, a process detecting module and an image processing module.

The process detecting module is installed into the real-time messaging video communication system by the start module, and the process detecting module detects whether the real-time messaging video communication system starts the real-time communication. When the real-time messaging video communication system starts the real-time communication, the image processing module receives a plurality of frame data to be displayed by the real-time messaging video communication system, and then generates a plurality of converted frame data corresponding to the frame data.

To achieve the above, the present invention also discloses a processing method of an image processing system, which is applied with at least one real-time messaging video communication system of an electronic device and contains a start module, a process detecting module and an image processing module. The processing method includes the following steps of: installing the process detecting module into the real-time messaging video communication system by the start module; detecting whether the real-time messaging video communication system starts the real-time communication by the process detecting module; installing the image process module into the real-time messaging video communication system when the real-time messaging video communication system starts the real-time communication; and generating a plurality of converted frame data by the image processing module in accordance with a plurality of frame data to be displayed by the real-time messaging video communication system, wherein the converted frame data is corresponding to the frame data.

As mentioned above, the image processing system and its processing method in accordance with the present invention includes the image processing module for rooming in the frame data and processing the image enhancement. In comparison with the prior art, the present invention is beneficial for improving the resolution of images so that it can provide clear images without upgrading cameras and internet bandwidths when the real-time messaging video communication system starts the real-time communication, thereby improving the practicability of real-time messaging video communication systems.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
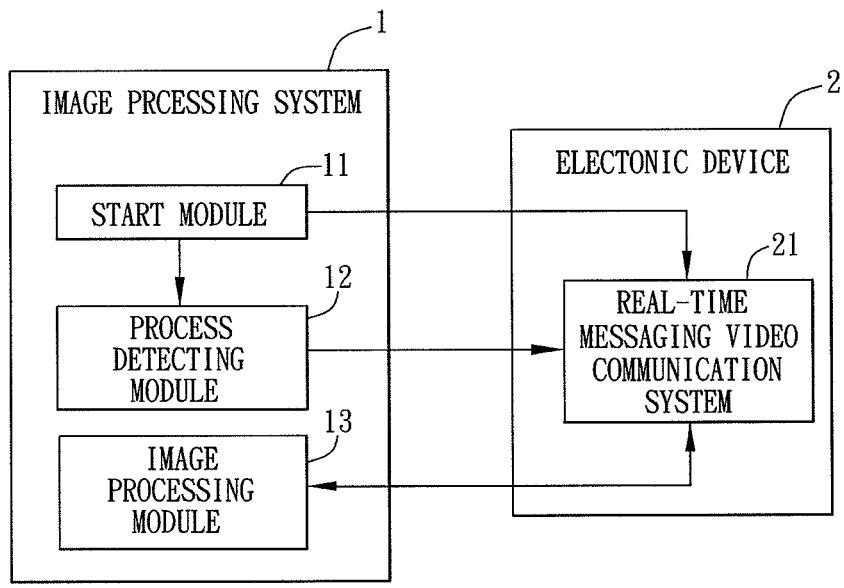
FIG. 1 is a block diagram of an image processing system and an electronic device according to a preferred embodiment of the invention.

FIG. 1 is a schematic view of an image processing system 1 and an electronic device 2 according to a preferred embodiment of the present invention.

As shown in FIG. 1, the image processing system 1 is applied with a real-time messaging video communication system 21 of the electronic device 2. The image processing system 1 includes a start module 11, a process detecting module 12 and an image processing module 13. In practice, the real-time messaging video communication system 21 can be MSN Messenger, Skype, Yahoo Messenger or other real-time communication systems having the similar functions.

The start module 11 installs the process detecting module 12 into the real-time messaging video communication system 21. In practice, the start module 11 specifically detects every processing step implemented in the electronic device 2. When the start module 11 detects the real-time messaging video communication system 21 of the electronic device 2 is enabled, it proceeds to install the process detecting module 12 into the real-time messaging video communication system 21.

The process detecting module 12 can detect whether the real-time messaging video communication system 21 starts the real-time communication. In practice, the process detecting module 12 can have a comparing table recording a plurality of parameter data of the real-time messaging video communication system 21. Therefore, the process detecting module 12 can detect whether the real-time messaging video communication system 21 starts the real-time communication by comparing the parameter data recorded on the comparing table. For example, these parameter data can be the titles of the processing steps, the names of the real-time messaging video communication systems or other related data used to determine whether a real-time messaging video communication system starts the real-time communication. Furthermore, in this embodiment, the process detecting module 12 can be a real-time process detecting module.

The image processing module 13 receives a plurality of frame data, which are to be displayed by the real-time messaging video communication system 21, when the real-time messaging video communication system 21 starts the real-time communication, and then generates a plurality of converted frame data corresponding to the frame data.

In practice, the image processing module 13 can be operated in a default processing mode, an enhanced processing mode and a comparing mode. As the image processing module 13 is operated in the default processing mode, it can room in/out the received original frame data. As the image processing module 13 is operated in the enhanced processing mode, it can process the received original frame data according to an image enhancement technique. As the image processing module 13 is operated in the comparing mode, the real-time messaging video communication system 21 can display both the original frame data and the converted frame data, which are processed by the image processing module 13.

To be noted, the image enhancement technique can process the original frame data according to an image optimization algorithm to generate clear images. In detail, the image optimization algorithm can be implemented by the following steps. Firstly, the original frame data is processed through a high-pass filter to extract the high frequency part from the original frame data. Meanwhile, the original frame data is also decomposed into a flat zone and an edge zone. Continuously, the original frame data and the flat zone are amplified according to a simple interpolation algorithm, and the edge zone and the high frequency part are amplified according to both a complicated and a simple interpolation algorithm. Finally, every amplified data individually obtained from the original frame data, the flat zone, the edge zone and the high frequency part are all combined together to generate a converted frame data with the features of anti-aliasing, sharp edges, detailed images and high contrast.

Figure 2:
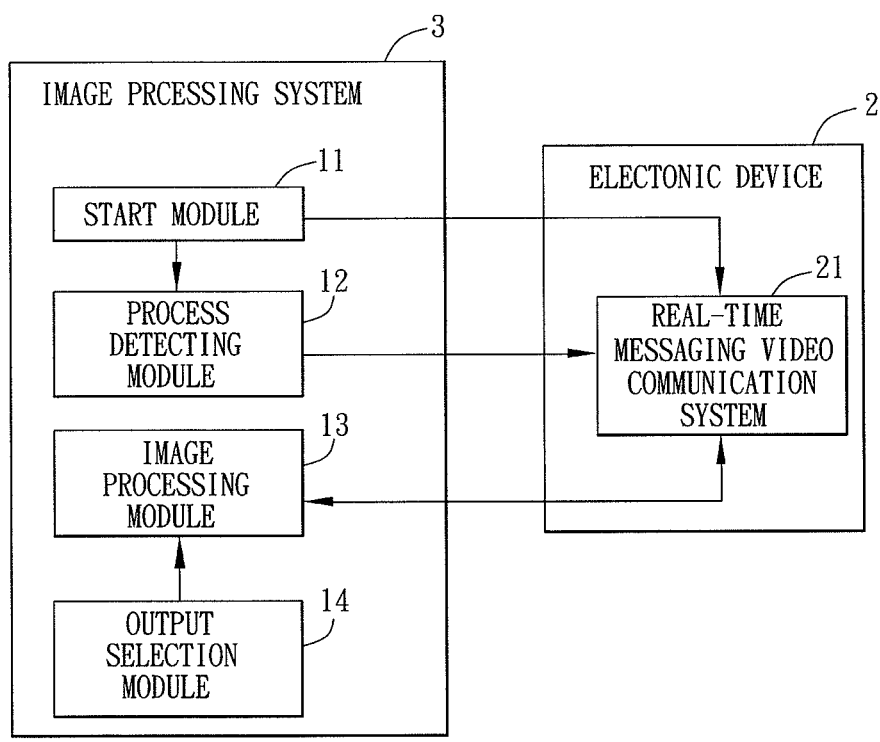
FIG. 2 is a block diagram of another image processing system and an electronic device according to the preferred embodiment of the invention.

Moreover, as shown in FIG. 2, the image processing system 3 further includes an output selection module 14. The output selection module 14 can enable the image processing module 13 to specifically convert the received original frame data into the converted frame data, and then output the converted frame data to the real-time messaging video communication system 21.

Figure 3:
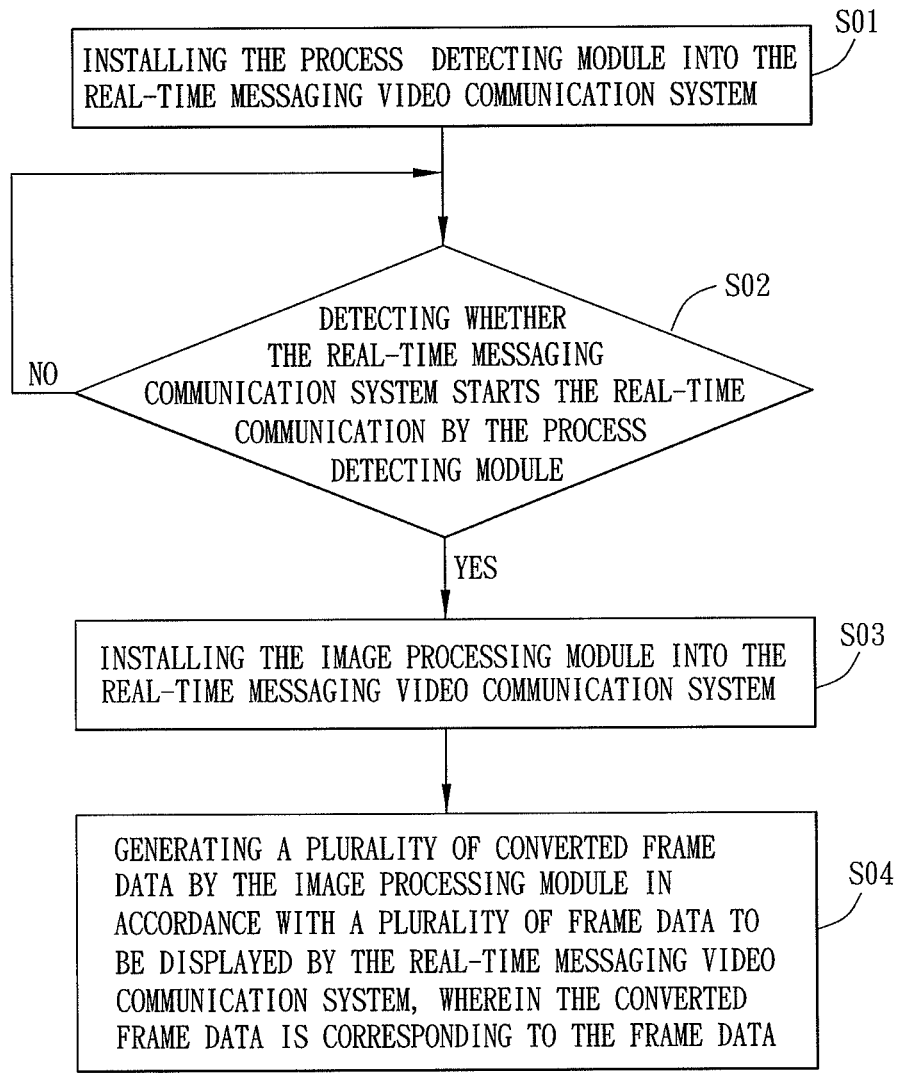
FIG. 3 is a flow chat of an image processing method according to a preferred embodiment of the invention.

With reference to the flow chart of FIG. 3 in view of FIG. 1, a processing method in accordance with the present invention is applied with the above-mentioned image processing system 1 and includes the steps S01 to S04.

In the step S01, the process detecting module 12 is installed into the real-time messaging video communication system 21 by the start module 11. In this embodiment, the start module 11, as mentioned above, can be used to detect every processing step in the electronic device 2. When the start module 11 detects the real-time messaging video communication system 21 of the electronic device 2 is enabled, it further installs the process detecting module 12 into the real-time messaging video communication system 21.

In the step S02, the process detecting module 12 detects whether the real-time messaging video communication system 21 starts the real-time communication. In the embodiment, the process detecting module 12 can detect whether the real-time messaging video communication system starts the real-time communication according to a comparing table recording a plurality of parameter data. Otherwise, the process detecting module 12 can also implement other means to detect whether the real-time messaging video communication system starts the real-time communication.

If the process detecting module 12 determines that the real-time messaging video communication system 21 has started the real-time communication, the step S03 is then performed to install the image processing module 13 into the real-time messaging video communication system 21. Otherwise, if the process detecting module 12 determines that the real-time messaging video communication system 21 has not started the real-time communication, the step S02 is implemented again. That is, the process detecting module 12 is a real-time process detecting module.

In the step 04, the image processing module 13 generates a plurality of converted frame data in accordance with a plurality of frame data, which are to be displayed by the real-time messaging video communication system 21. In addition, the converted frame data is corresponding to the frame data. In practice, the image processing module 13 can be operated in a default processing mode, an enhanced processing mode or a comparing mode, respectively, to process the frame data optionally by rooming in/out the frame data, converting the frame data according to an image enhancement technique, or displaying both the frame data and the converted frame data on the real-time messaging video communication system 21.

Figure 4:
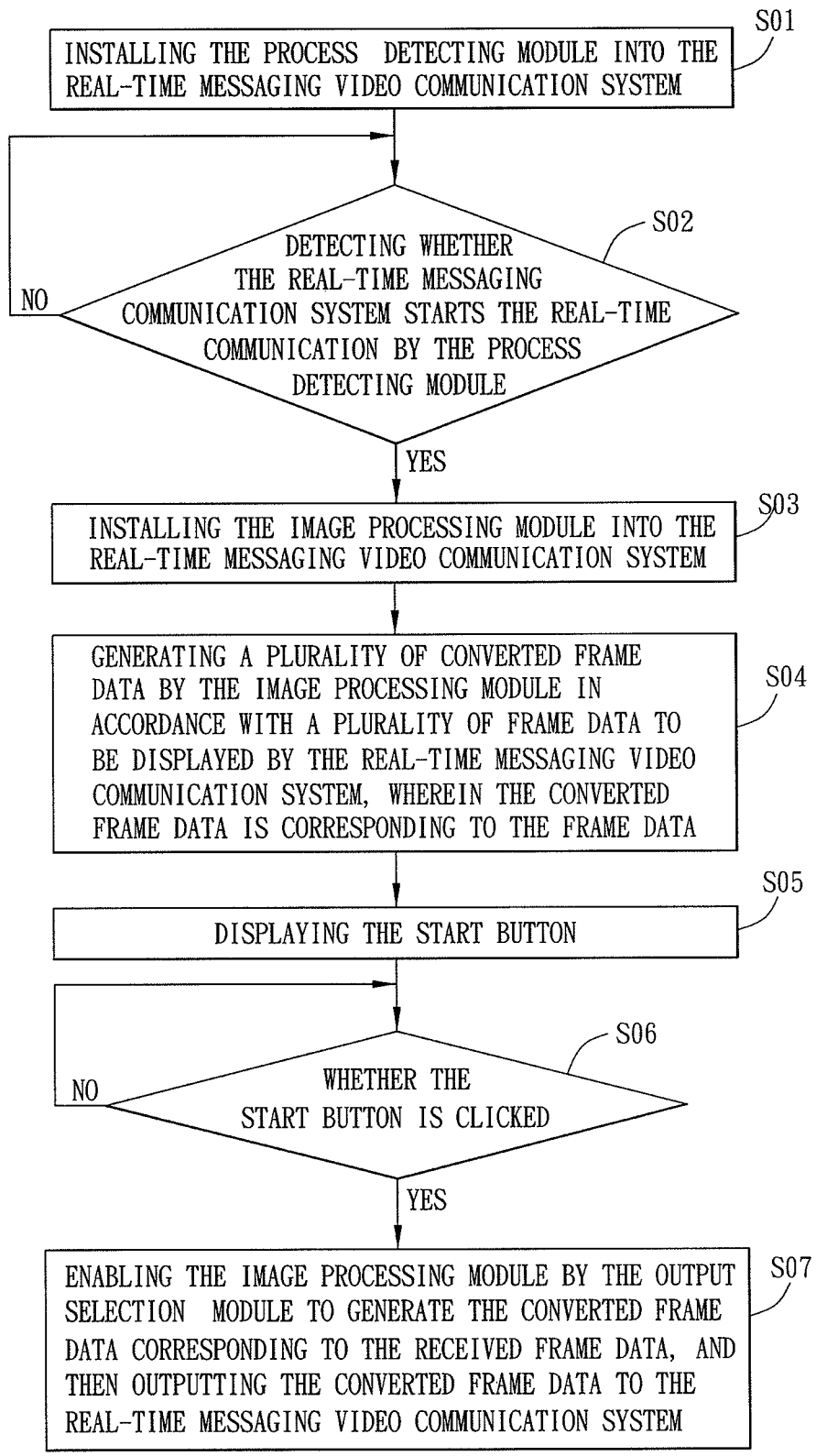
FIG. 4 is a flow chat of another image processing method according to the preferred embodiment of the invention.

As shown in FIG. 4, a processing method of the image processing system according to another embodiment is applied with the above-mentioned image processing system 3. In the current embodiment, the processing method further includes the steps S05 to S07. In the step S05, a start button is displayed. The processing method further determines whether the start button is clicked in the step 06. After the start button has been clicked, the step 07 is then implemented. Oppositely, if the start button has not been clicked, the step S06 is implemented again. In the step S07, an output selection module 14 enables the image processing module 13 to generate the converted frame data corresponding to the received frame data, and then output the converted frame data to the real-time messaging video communication system 21.

It is noted that users only have to install and enable the image processing system and then the image process system automatically implements the processing method described above to provide clear images. In fact, even if the electronic device has more than one real-time messaging video communication system simultaneously, such as MSN Messenger, Skype and Yahoo Messenger, the image processing system still can implement image processing independently for each real-time messaging video communication system once the image processing system has been enabled.

The image processing system of the present invention and its processing method will be described hereinafter. In order to make the invention more comprehensive, the real-time messaging video communication system is, for example but not limited to, MSN Messenger.

If the image processing system of the present invention has been installed into an electronic device, the start module of the image processing system can obtain related data of every processing step by an application programming interface (API) of the electronic device.

When the start module detects that the real-time messaging video communication system (MSN Messenger) exists, it can install dynamic link library (DLL) of the process detecting module into MSN Messenger through the application programming interface. In practice, the above-mentioned installation can be completed by either one of the following two ways. The first way is to use the standard hook technique provided by Microsoft Corp. to install the process detecting module into each real-time messaging video communication system. The second way is to alter the access code of the application programming interface built in the real-time messaging video communication system to redirect to the image processing system of the present invention.

When MSN Messenger starts the real-time communication, the image processing module can initialize the data for image processing, and installs a graphics device interface (GDI) into the real-time messaging video communication system to obtain every frame data to be displayed by the real-time messaging video communication system. In practice, the image processing module fills particular function data in the API of MSN Messenger (e.g. StretchDIBits). When MSN Messenger implements the certain function, it can call the image processing module to retrieve every frame data.

Continuously, the image processing module can be operated in a default processing mode, an enhanced processing mode or a comparing mode according to user's needs. For example, when the image processing module is operated in the default processing mode, it only rooms in or rooms out the frame data. In addition, when the image processing module is operated in the enhanced processing mode, the features of each received frame data, such as sharpness, DeBlock, DeNoise, and resolution are optimized for the sake of providing clearer images. Moreover, when the image processing module is operated in the comparing mode, the original images (frame data) and the processed images (converted frame data) are both provided to the users.

According to the hardware structure and the processing method described above, the image processing system can start automatically when the electronic device is enabled. Moreover, after the real-time messaging video communication system starts the real-time communication, the image processing module can specifically process the frame data to be displayed by the real-time messaging video communication system, thereby providing clear images.

In summary, the image processing system and its processing method in accordance with the present invention can combine the image processing system and the real-time messaging video communication systems together via the start module and the process detecting module of the image processing system. Moreover, the image processing module of the image processing system can room in the frame data and process the image enhancement. In comparison with the prior art, the present invention can improve image resolution without upgrading the camera and the internet bandwidth so that it is able to not only provide clear images but also improve the practicability of image processing systems when the real-time messaging video communication system starts the real-time communication.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image processing system, which is applied with at least one real-time messaging video communication system of an electronic device, comprising:
   a start module;
   a process detecting module detecting whether the real-time messaging video communication system starts the real-time communication, wherein the process detecting module is installed into the real-time messaging video communication system by the start module; and
   an image processing module receiving a plurality of frame data to be displayed by the real-time messaging video communication system when the real-time messaging video communication system starts the real-time communication, and generating a plurality of converted frame data corresponding to the frame data,
   wherein when the image processing module is operated in an enhanced processing mode, the frame data is processed to extract a high frequency part from the frame data, and the frame data is decomposed into a flat zone and an edge zone, the frame data and the flat zone are amplified according to a first interpolation algorithm, and the edge zone and the high frequency part are amplified according to both a second interpolation algorithm and the first interpolation algorithm, and the converted frame data is generated by combining every amplified data individually obtained from the frame data, the flat zone, the edge zone and the high frequency part.

2. The image processing system of claim 1, wherein the process detecting module has a comparing table recording a plurality of parameter data of the real-time messaging video communication system.

3. The image processing system of claim 2, wherein the process detecting module detects whether the real-time messaging video communication system starts the real-time communication in accordance with the parameter data.

4. The image processing system of claim 1, wherein the process detecting module is a real-time process detecting module.

5. The image processing system of claim 1, further comprising:
   an output selection module enabling the image processing system to generate the converted frame data corresponding to the frame data and then outputting the converted frame data to the real-time messaging video communication system.

6. The image processing system of claim 1, wherein the image processing module is further operated in a default processing mode or a comparing mode.

7. The image processing system of claim 6, wherein the image processing module generates the converted frame data by rooming in/out the frame data as the image processing module is operated in the default processing mode.

8. The image processing system of claim 6, wherein the real-time messaging video communication system displays both the frame data and the converted frame data as the image processing module is operated in the comparing mode.

9. A processing method of an image processing system, the image processing system being applied with at least one real-time messaging video communication system of an electronic device and containing a start module, a process detecting module and an image processing module, the processing method comprising the steps of:

instaling the process detecting module into the real-time messaging video communication system by the start module;

detecting whether the real-time messaging video communication system starts the real-time communication by the process detecting module;

installing the image process module into the real-time messaging video communication system when the real-time messaging video communication system starts the real-time communication; and generating a plurality of converted frame data by the image processing module in accordance with a plurality of frame data to be displayed by the real-time messaging video communication system, wherein the converted frame data is corresponding to the frame data, wherein when the image processing module is operated in an enhanced processing mode, the frame data is processed to extract a high frequency part from the frame data, and the frame data is decomposed into a flat zone and an edge zone, the frame data and the flat zone are amplified according to a first interpolation algorithm, and the edge zone and the high frequency part are amplified according to both a second interpolation algorithm and the first interpolation algorithm, and the converted frame data is generated by combining every amplified data individually obtained from the frame data, the flat zone, the edge zone and the high frequency part.

10. The processing method of claim 9, wherein the process detecting module has a comparing table recording a plurality of parameter data of the real-time messaging video communication system.

11. The processing method of claim 10, wherein the process detecting module detects whether the real-time messaging video communication system starts the real-time communication in accordance with the parameter data.

12. The processing method of claim 9, further comprising a step of:

enabling the image processing module by an output selection module to generate the converted frame data corresponding to the frame data and then outputting the converted frame data to the real-time messaging video communication system.

13. The processing method of claim 9, wherein the image processing module is further operated in a default processing mode or a comparing mode.

14. The processing method of claim 13, wherein the image processing module generates the converted frame data by rooming in/out the frame data as the image processing module is operated in the default processing mode.

15. The processing method of claim 13, wherein the real-time messaging video communication system displays both the frame data and the converted frame data are outputted as the image processing module is operated in the comparing mode.

* * * * *